United States Patent
Pennec et al.

(10) Patent No.: US 8,270,916 B2
(45) Date of Patent: Sep. 18, 2012

(54) METHODS FOR TUNING AND CONTROLLING OUTPUT POWER IN POLAR TRANSMITTERS

(75) Inventors: Christian Pennec, Cupertino, CA (US); Herb Evans, Sunnyvale, CA (US)

(73) Assignee: Panasonic Corporation, Osaka (JP)

( * ) Notice: Subject to any disclaimer, the term of this patent is extended or adjusted under 35 U.S.C. 154(b) by 724 days.

(21) Appl. No.: 12/351,739

(22) Filed: Jan. 9, 2009

(65) Prior Publication Data

US 2010/0178886 A1     Jul. 15, 2010

(51) Int. Cl.
    *H01Q 11/12*     (2006.01)
(52) U.S. Cl. ............... 455/127.1; 455/127.2; 455/127.3; 455/114.3; 455/115.1; 455/115.2; 455/115.3; 455/108; 455/110; 375/295; 375/297; 375/300; 375/302; 330/127; 330/129; 330/278
(58) Field of Classification Search ............. 455/126, 455/127.1–127.3, 114.3, 115.1, 115.3, 108, 455/110, 115.2; 375/295, 296, 297, 300, 375/302, 320; 330/127–142, 278–280, 282, 330/291–293
See application file for complete search history.

(56) References Cited

U.S. PATENT DOCUMENTS

| | | | |
|---|---|---|---|
| 7,010,276 B2 * | 3/2006 | Sander et al. | 455/108 |
| 7,889,688 B2 * | 2/2011 | Kitahara et al. | 370/311 |
| 2004/0219891 A1 * | 11/2004 | Hadjichristos | 455/102 |
| 2005/0221764 A1 * | 10/2005 | Shen et al. | 455/67.15 |
| 2009/0252255 A1 * | 10/2009 | Lee et al. | 375/297 |

* cited by examiner

*Primary Examiner* — Junpeng Chen (57) ABSTRACT

A power tuning method determines values of a magnitude control signal that controls the magnitude of an amplitude-modulated power supply signal applied to a power supply port of a power amplifier of a polar transmitter and an amplitude control signal that controls the amplitude of a constant-envelope phase-modulated signal applied to a radio frequency input port of the power amplifier necessary to set the output power of the polar transmitter to a target output power. The method is repeated and performed for a plurality of different target output powers. Output-power-level dependent power control parameters calculated from the applied method are used to set the values of the magnitude control and amplitude control signals during normal operation. Using the output-power-level dependent power control parameters, the magnitude control and amplitude control signals are changed in a continuous manner with changes in output power and over the full dynamic range of output powers the polar transmitter can be commanded to operate, thereby obviating any need for a closed-loop power detection mechanism to correct for power discontinuities.

6 Claims, 9 Drawing Sheets

FIGURE 1 (Prior Art)

| TPC_cmd | Transmitter power control range | | | | | |
|---|---|---|---|---|---|---|
| | 1 dB step size | | 2 dB step size | | 3 dB step size | |
| | Lower | Upper | Lower | Upper | Lower | Upper |
| +1 | +0.5 dB | +1.5 dB | +1 dB | +3 dB | +1.5 dB | +4.5 dB |
| 0 | -0.5 dB | +0.5 dB | -0.5 dB | +0.5 dB | -0.5 dB | +0.5 dB |
| -1 | -0.5 dB | -1.5 dB | -1 dB | -3 dB | -1.5 dB | -4.5 dB |

| RF Output Power Level Pout (dBm) | AM Path Magnitude Control Parameter | PM Path Attenuation Control Parameter |
|---|---|---|
| 24 | A(24) | Att(24) |
| 23 | A(23) | Att(23) |
| 22 | A(22) | Att(22) |
| 21 | A(21) | Att(21) |
| ⋮ | ⋮ | ⋮ |
| -49 | A(-49) | Att(-49) |
| -50 | A(-50) | Att(-50) |

METHODS FOR TUNING AND CONTROLLING OUTPUT POWER IN POLAR TRANSMITTERS

FIELD OF THE INVENTION

The present invention relates in general to methods and apparatus for controlling output power in communications transmitters. More specifically, the present invention relates to methods and apparatus for tuning and controlling output power in polar transmitters.

BACKGROUND OF THE INVENTION

To increase the amount of information that can be transmitted in a given bandwidth of the radio frequency (RF) spectrum (i.e., to increase what is referred to in the art as "spectral efficiency"), modern wireless communications technologies such as Wideband Code Division Multiple Access (W-CDMA) use non-constant envelope modulation schemes in which both the amplitude (i.e., envelope) and angle (i.e., phase or frequency) of the RF signal to be transmitted are varied.

To accommodate non-constant envelope modulation schemes in conventional quadrature-modulator-based transmitters, the output power of the quadrature-modulator-based transmitter's RF power amplifier (PA) must be backed off to prevent the PA from clipping the signal peaks of the non-constant envelope signals. Maintaining linearity also requires that the PA be configured to operate exclusively in its linear region of operation (i.e., that a 'linear PA' be used). Failure to back off the output power and use a linear PA results in signal distortion at the output of the PA, making it difficult to comply with noise level restrictions imposed by communications standards.

The need to back off output power and use a linear PA results in a sacrifice of energy efficiency for linearity. This trade-off is highly undesirable, especially in applications in which the transmitter is used in battery-powered communications devices, such as in cellular handsets. Fortunately, an alternative type of transmitter, commonly known as a polar transmitter, is available, which avoids the efficiency versus linearity trade-off.

Figure 1:
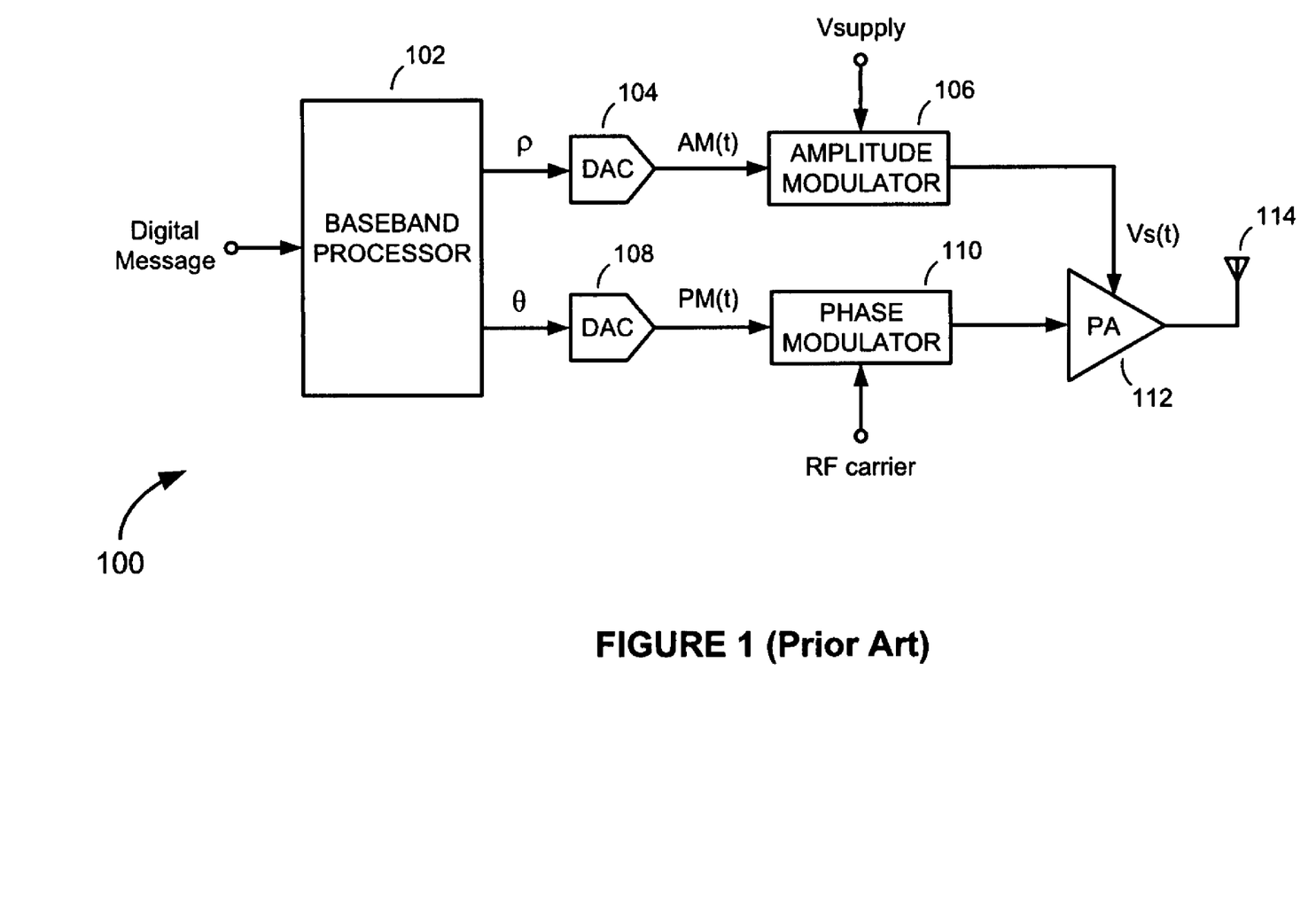
FIG. 1 is a simplified drawing of a conventional polar transmitter.

FIG. 1 is a simplified drawing of a typical polar transmitter 100. The polar transmitter 100 includes a baseband processor 102; an amplitude modulation (AM) path including an AM path digital-to-analog converter (DAC) 104 and an amplitude modulator 106; a phase modulation (PM) path including a PM path DAC 108 and a phase modulator 110; a PA 112; and an antenna 114.

The baseband processor 102 is responsible for performing the signal processing functions of the polar transmitter 100, including generating digital amplitude and phase modulation data streams ρ and θ from a digital message to be transmitted and formatting the digital amplitude and phase modulation data streams ρ and θ according to a predetermined modulation scheme. The AM and PM path DACs 104 and 108 convert the digital amplitude and phase modulation data streams ρ and θ into analog amplitude and phase modulation signals AM(t) and PM(t).

The amplitude modulator 106 modulates a DC power supply Vsupply according to the amplitude variations in the analog amplitude modulation signal AM(t), to provide an amplitude-modulated power supply signal Vs(t) which is coupled to the power supply port of the PA 112. Meanwhile, the phase modulator 110 modulates an RF carrier signal according to the phase variations in the analog phase modulation signal PM(t), to provide a phase-modulated RF carrier signal which is coupled to the RF input port of the PA 112.

Because the phase-modulated RF carrier signal at the RF input port of the PA 112 has a constant envelope, the PA 112 can be configured to operate as a highly efficient nonlinear PA without concern for distorting the amplitude information, which as explained above is processed in the separate AM path. Typically, the PA 112 is implemented as a Class D, E or F switch-mode PA operating between compressed and cut-off states (i.e., in a "compressed mode"), so that the output power of the PA 112 is directly controlled and modulated according to the amplitude variations in the amplitude-modulated power supply signal Vs(t). By modulating the power supply port of the PA 112 in this manner, the amplitude modulation represented in the original digital amplitude modulation data stream ρ is restored at the output of the PA 112, to provide the desired amplitude- and phase-modulated RF carrier signal.

Some communications systems require RF transmitters of wireless communications devices to be capable of controlling RF output power over a wide dynamic range. For example, the 3rd Generation Partnership Project (3GPP) TS 25.101 specification, which standardizes the transmission and reception requirements of user equipment (UE) in Universal Mobile Telecommunications System (UMTS) cellular networks, requires RF transmitters of UE to be capable of controlling RF output power over a range of −50 dBm to +24 dBm (where 1 dBm corresponds to a 1 milliwatt reference). Controlling RF output power over such a wide dynamic range presents a difficult challenge. In a polar transmitter, controlling RF output power is especially difficult at the lower end of the RF output power range. At low RF output powers, when the magnitude of the amplitude-modulated power supply signal Vs(t) is low, leakage (i.e., feed-through) of the phase-modulated RF carrier signal from the RF input of the PA 112, through an input-output parasitic capacitance, to the RF output of the PA 112 occurs. The leaked signal has the effect of degrading the signal-to-noise ratio (SNR) at the RF output of the PA 112. The degraded SNR makes it difficult to comply with noise level restrictions set by standards, e.g., such as those set forth in Section 6 of the 3GPP TS 25.101 specification.

To overcome this problem and extend the effective power control range to lower RF output powers, the PA 112 of the polar transmitter 100 can be configured to operate in what is referred to in the art as "product mode" (or "multiplicative mode") during times the polar transmitter 100 is to transmit below some predetermined RF output power (e.g., less than 0 dBm), and in compressed mode at higher RF output powers. Such an approach is described in U.S. Pat. No. 7,010,276 to Sander et al. In product mode the PA 112 operates in its deep triode region, where the RF output power of the PA 112 is determined by the product of the magnitude of the amplitude-modulated power supply signal Vs(t) and the magnitude of the phase-modulated RF carrier signal, rather than just by the magnitude of the amplitude-modulated power supply signal Vs(t), as in compressed mode. RF output power is controlled in product mode by manipulating the amplitude of the RF input drive to the PA 112 (i.e., the amplitude of the phase-modulated RF carrier signal) while the magnitude of the amplitude-modulated power supply signal Vs(t) is held at a fixed value. This allows the RF output power to be controlled without having to reduce the magnitude of the amplitude-modulated power supply signal Vs(t) to a level that would result in SNR degradation at the RF output of the PA 112.

Figure 2:
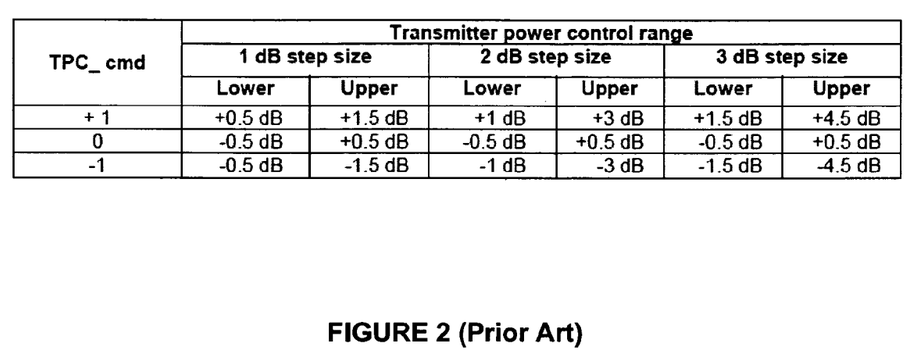
FIG. 2 is a table showing power-step-size-dependent power control ranges user equipment (UE) must comply with following a step change in RF output power directed by transmit power control (TPC) commands of +1, 0 and −1 in a Universal Mobile Telecommunications System (UMTS) cellular network, as set forth in the 3rd Generation Partnership Project (3GPP) TS 25.101 standard.

In addition to requiring a wide dynamic range in RF output power control, wireless communications standards also often require an RF transmitter to control its RF output power in certain well-defined steps. For example, the 3GPP TS 25.101 specification requires RF transmitters of UE to be capable of incrementing and decrementing RF output power in discrete power steps of 1, 2 and 3 dB, in response to transmit power control (TPC) commands received from UMTS base stations. The specification further requires that the RF output power, following each power step, comply with certain power-step-size-dependent power control ranges (i.e., tolerances), as shown in the table in FIG. 2. For example, a TPC command of +1 requires that the RF output power of an RF transmitter following a power step size of +1 dB to be within +/− 0.5 dB of the target RF output power.

Figure 3A:
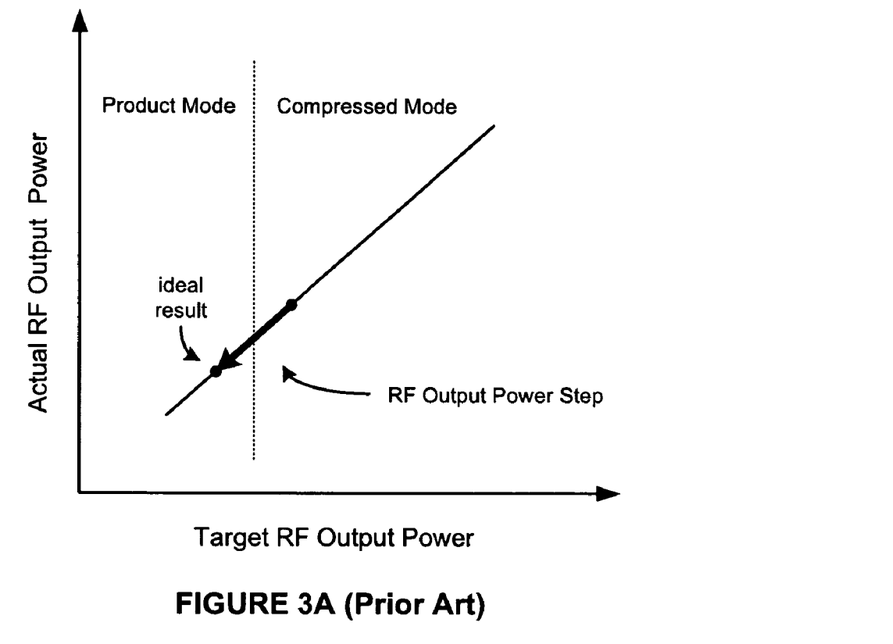
FIG. 3A is a simplified graph of ideal RF output power characteristics of a polar transmitter, highlighting the continuous transition between the compressed and product mode RF output power curves.
Figure 3B:
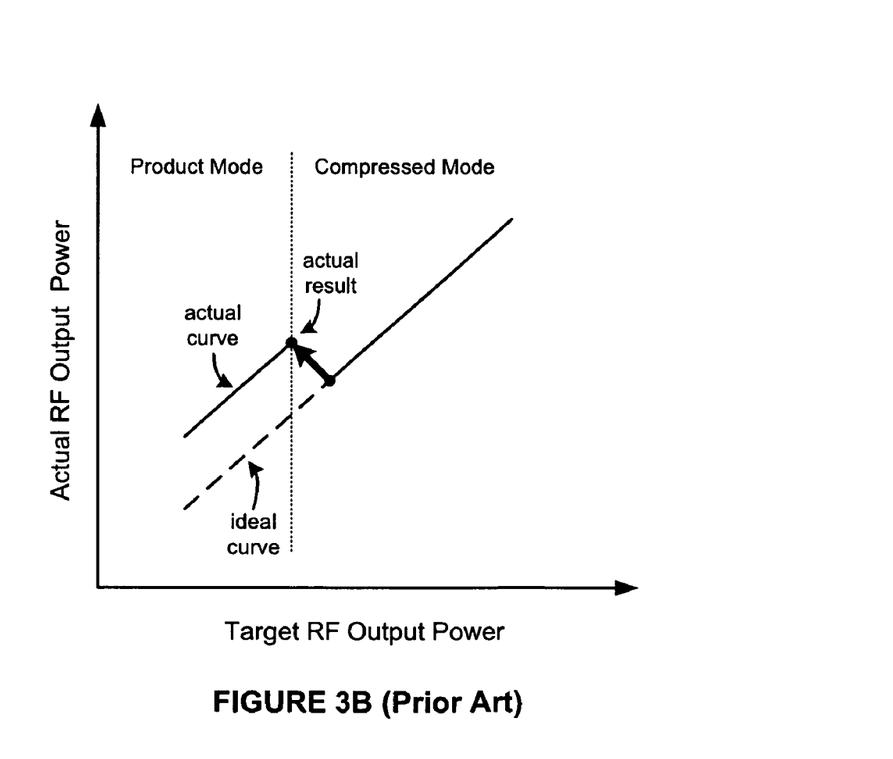
FIG. 3B is a simplified graph of the actual RF output power characteristics of a polar transmitter, highlighting the temperature-dependent power discontinuity (i.e., power gap) that is often observed between the compressed and product mode RF output power curves.

Designing a polar transmitter that is capable of complying with a +/− 0.5 dB power control range following a 1 dB power step size presents a difficult challenge, particularly when the power step involves a mode switch between compressed and product modes. Ideally, and as illustrated in FIG. 3A, the actual RF output power of the polar transmitter, when plotted against a range of commanded RF output powers, is continuous over the full dynamic range of RF output powers the polar transmitter can be commanded to operate, including the mode transition region between product and compressed modes. However, in real applications the RF output power curves for the product and compressed modes behave differently depending on temperature. As shown in FIG. 3B, at some temperatures a time-varying power discontinuity (i.e., power gap) occurs between the compressed and product mode RF output power curves. For some temperatures the power discontinuity is wide enough that the +/− 0.5 dB power control range following a 1 dB step in RF output power specified in the UMTS standard cannot be complied with.

Previous attempts to account for the temperature-dependent power discontinuity between compressed and product modes rely on a power detector configured between the RF output of the PA 112 and the baseband processor 102. The power detector is configured to measure the RF output power during times when a power change command involves a mode switch from product mode to compressed mode or vice versa. The measured RF output power is fed back to the baseband processor 102, which compares the measured RF output power to an expected RF output power to determine the difference (i.e., error) between the two. Based on the error, the baseband processor then adjusts power control settings to the polar transmitter's PA 112 to compensate for misalignment of the product and compressed mode power curves.

Reliance on a power detector and feedback to account for the temperature-dependent power discontinuity between compressed and product modes presents a number of drawbacks. First, the power detector and other supporting circuitry increase the hardware complexity of the polar transmitter 100. Second, utilizing the power detector renders the polar transmitter 100 a closed-loop system, requiring a fast response time, particularly during times when a power step involves a mode switch and correction for misalignment of the product and compressed mode power curves. The fast response time results in higher system clock rates, which not only increases the complexity of the baseband processor 102 but also undesirably results in higher energy consumption. Third, accurate compensation for misalignment of the product and compressed mode power curves require that the power detector be capable of detecting RF output powers to within a fraction of a dB over a wide dynamic range of RF output powers. Unfortunately, a power detector having these capabilities is difficult to design, even with the aid of factory calibration.

Considering the drawbacks and limitations of previous attempts at controlling RF output power in polar transmitters, it would be desirable to have methods and apparatus for controlling RF output power in polar transmitters over a wide dynamic range with the power control accuracy demanded by modern wireless communication standards.

SUMMARY OF THE INVENTION

A power tuning method applied during manufacturing or a calibration phase comprises determining values of a magnitude control signal that controls the magnitude of an amplitude-modulated power supply signal applied to a power supply port of a power amplifier (PA) of a polar transmitter and an amplitude control signal that controls the amplitude (and, consequently, signal power) of a constant-envelope phase-modulated signal applied to a radio frequency input port of the PA necessary to set the output power of the PA to a target output power. The power tuning method is repeated and performed for a plurality of different target output powers the polar transmitter may be commanded to operate during normal operation.

For each target output power for which the power tuning method is applied, power control parameters are calculated based on the values of the magnitude control and amplitude control signals determined as being necessary to set the output power of the polar transmitter's PA to the target output power. According to one exemplary embodiment, the power control parameters for each target output power are arranged in a look up table (LUT). The LUT entries are then made available to a baseband processor of the polar transmitter to set and control the values of the magnitude control and amplitude control signals during normal operation (i.e., in the field), depending on the required output power. In an alternative embodiment, the power control parameters comprise output-power-level dependent polynomial coefficients, which are used by the baseband processor during normal operation to modify a polynomial equation characterizing the input-output power characteristics of the PA and set the values of the magnitude control and amplitude control signals to their output-power-level dependent values.

By applying the power tuning method of the present invention, the magnitude of the amplitude-modulated power supply signal and the signal power of the constant-envelope phase-modulated signal are varied in a continuous manner as the output power of the polar transmitter is commanded to change. In other words, the magnitude of the amplitude-modulated power supply signal and the input signal power of the constant-envelope phase-modulated signal, when plotted as a function of output power over the range of output powers the polar transmitter may be commanded to operate, have no discontinuities or steps.

The power tuning method of the present invention offers a number of advantages and benefits over prior approaches to controlling output power in polar transmitters. First, application of the power tuning method results in a power-tuned polar transmitter capable of controlling output power without any need of a power detector or feedback. In other words, unlike prior approaches, the resulting power-tuned polar transmitter is an open-loop system. Second, application of the power tuning method allows the output power of the resulting power-tuned polar transmitter to be controlled in a continuous manner, over a full dynamic range of output powers the polar transmitter may be commanded to operate, and without any abrupt switching between product and compressed modes. Finally, application of the power tuning method results in a power-tuned polar transmitter capable of complying with stringent power control ranges specified by communications standards, such as the +/− 0.5 dB power control range following a power steps size of 1 dB specified in the 3GPP TS 25.101 standard.

Further features and advantages of the present invention, including a description of the structure and operation of the above-summarized and other exemplary embodiments of the invention, are described in detail below with respect to accompanying drawings, in which like reference numbers are used to indicate identical or functionally similar elements.

DETAILED DESCRIPTION

A power tuning method applicable to a polar transmitter employing a switch-mode radio frequency (RF) power amplifier (PA) and a power-tuned polar transmitter configured to control its output power based on control parameters derived from the applied power tuning method are disclosed. In the exemplary embodiments of the invention described below, the power tuning method and resulting power-tuned polar transmitter are described in the context of satisfying power control specifications set forth in the 3GPP TS 25.101 standard, which as explained above standardizes the transmission characteristics of cellular handsets operated in Universal Mobile Telecommunications System (UMTS) cellular networks. Applying the power tuning method ensures that the resulting power-tuned polar transmitter is capable of accurately controlling its output power over at least a −50 dBm to +24 dBm range, thereby satisfying the power control range requirements of a Class 3 transmitter set forth in the 3GPP TS 25.101 standard. Application of the power tuning method also ensures that the output power of the power-tuned polar transmitter, following a change in output power, complies with the power control ranges (i.e., power control tolerances) specified by the 3GPP TS 25.101 standard.

While the power tuning method and power-tuned polar transmitter in the exemplary embodiments that follow are described in the context of a UMTS application, and for the purpose of complying with the transmission characteristics set forth in the 3GPP TS 25.101 standard in particular, the power tuning method and power-tuned polar transmitter are not restricted to UMTS applications or to complying with the 3GPP TS 25.101 standard. Indeed, the power tuning method and power-tuned polar transmitter may be used in any application in which output power of a transmitter must be controlled with high accuracy over a wide dynamic range, such as in Worldwide Interoperability for Microwave Access (WiMax), 3GPP Long Term Evolution (LTE) applications, for example. Finally, although the power tuning method of the present invention is described in the exemplary embodiments as being applicable to a polar transmitter of a cellular handset, the method may be alternatively used, adapted, or modified for application to polar transmitters used in other contexts, such as polar transmitters employed in base stations or polar transmitters configured for use in non-cellular applications.

Reference will now be made in detail to various exemplary embodiments of the invention. Before the power tuning method of the present invention is explained in detail, an exemplary polar transmitter that has been configured to control its output power based on prior application of the power tuning method (i.e., a "power-tuned" polar transmitter) is described.

Figure 4:
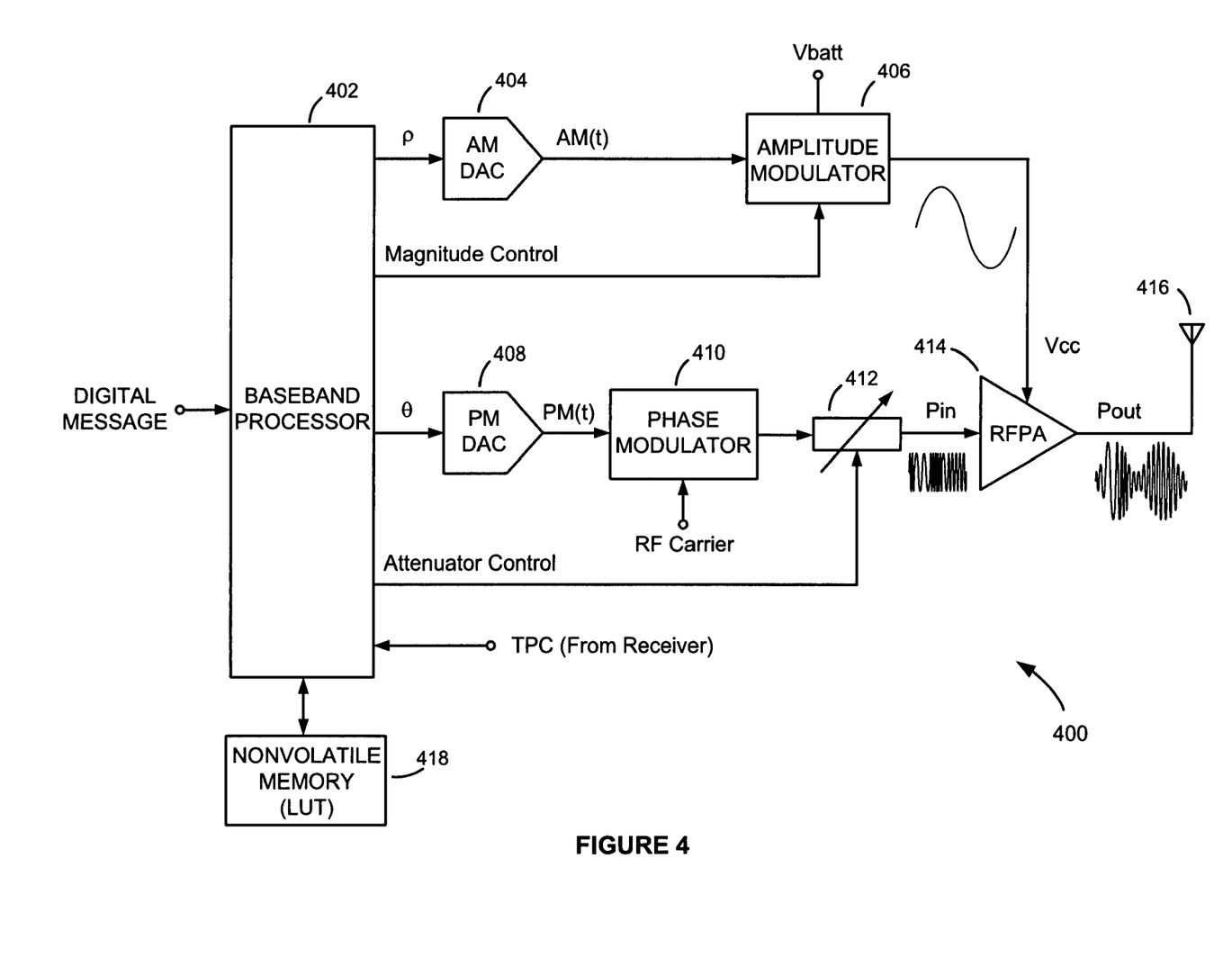
FIG. 4 is drawing of a polar transmitter, according to an embodiment of the present invention.

Referring first to FIG. 4, there is shown a drawing of a power-tuned polar transmitter 400, according to an embodiment of the present invention. The power-tuned polar transmitter 400 comprises a baseband processor 402, an amplitude modulation (AM) path digital-to-analog converter (ADC) 404 and amplitude modulator 406 configured in an AM path; a phase modulation (PM) path DAC 408, phase modulator 410 and an amplitude control circuit (such as an attenuator 412 (as shown) or alternatively a variable gain amplifier) configured in a PM path; a PA 414; an antenna 416; and a nonvolatile memory 418. The various components of the power-tuned polar transmitter 400 are formed in one or more integrated circuits (ICs), and may be integrated with a receiver portion to form a transceiver, although for ease in illustration of the invention the receiver portion has been omitted from the drawing.

The baseband processor 402 comprises a digital or mixed signal circuit including a microprocessor, microcontroller or other digital signal processor and random access memory (RAM). It is responsible for performing the signal processing functions of the power-tuned polar transmitter 400, including, among other functions, generating digital amplitude and phase modulation data streams ρ and θ from a digital message to be transmitted and formatting the digital amplitude and phase modulation data streams ρ and θ according to a predetermined modulation scheme. It is further responsible for generating and setting output-power-level dependent magnitude control and attenuator control signals for the AM and PM paths, as will be described in detail below.

During operation the digital phase modulation data stream θ produced by the baseband processor 402 is fed to the input of the PM path DAC 408 in the PM path of the power-tuned polar transmitter 400. The PM path DAC 408 converts the digital phase modulation data stream θ into an analog PM signal based on the phase modulation levels represented in the digital phase modulation data stream θ. The phase modulator 410 modulates an RF carrier signal according to the PM in the analog PM signal, producing a constant-envelope phase-modulated RF carrier signal. The attenuator 412 operates to attenuate the constant-envelope phase-modulated RF carrier signal at the output of the phase modulator 410 depending on the attenuator control signal generated by the baseband processor 402. The attenuator 412 responds to the attenuator control signal by decreasing or increasing the amplitude of the constant-envelope phase-modulated RF carrier signal, depending on the RF output power level the power-tuned polar transmitter 400 is commanded to operate, as will be explained in further detail below. In an alternative embodiment, a variable gain amplifier (VGA) is used, instead of an attenuator 412, and the amplitude of the phase-modulated RF carrier signal is varied in response to a gain control signal generated by the baseband processor 402. The resulting amplitude-adjusted constant-envelope phase-modulated RF carrier signal is applied to the RF input port of the PA 414.

While the amplitude-adjusted constant-envelope phase-modulated RF carrier signal is being generated in the PM path, a magnitude-adjusted amplitude-modulated power supply signal Vcc containing the AM is generated in the AM path. Specifically, based on the amplitude modulation levels represented in the digital amplitude modulation data stream ρ, the AM path DAC 404 converts the digital amplitude modulation data stream ρ into an analog AM signal. The amplitude modulator 406, which may comprise a linear regulator or a switching converter of some sort, then modulates a DC power supply voltage Vbatt (e.g., as provided by the polar transmitter's battery) according to the AM in the analog AM signal. The magnitude control signal generated by the baseband processor 402 is used to adjust the magnitude of the resulting amplitude-modulated power supply signal Vcc depending on the RF output power level the power-tuned polar transmitter 400 is commanded to operate. Finally, the magnitude-adjusted amplitude-modulated power supply signal Vcc produced at the output of the amplitude modulator 406 is applied to the power supply port of the PA 414.

The power-tuned polar transmitter 400 is responsive to transmit power control (TPC) commands from a remote base station. The TPC commands direct the power-tuned polar transmitter 400 to adjust its RF output power in specific well-controlled power steps. According to one embodiment, the power-tuned polar transmitter 400 is configured to control its RF output power over at least a −50 dBm to +24 dBm dynamic range in power steps sizes of 1, 2 or 3 dB, depending on the power step size indicated in each TPC command, thereby satisfying the power control requirements of a Class 3 transmitter specified in the 3GPP TS 25.101 standard. For each commanded power step, the baseband processor 402 responds by adjusting the magnitude control signal to the amplitude modulator 406 and the attenuator control signal to the attenuator 412, as will be explained in more detail below.

According to one embodiment of the invention, values of the magnitude control and attenuator control signals are calculated from AM path magnitude control parameters A(Pout) and PM path attenuation control parameters Att(Pout) configured in a look up table (LUT), which has been preloaded into the baseband processor RAM prior to normal operation from the nonvolatile memory 418 (e.g., during power-up or during a system setup process). The LUT may be encoded in various different ways. In an exemplary LUT 500 shown in FIG. 5, a plurality of AM path magnitude control parameters A(Pout) and a corresponding plurality of PM path attenuation control parameters Att(Pout) are included in the LUT 500 for a plurality of RF output power levels the power-tuned polar transmitter 400 is configurable to operate. The values of the AM path magnitude control and PM path amplitude control parameters A(Pout) and Att(Pout) are predetermined by prior application of the power tuning method 600 described in detail below. In this particular exemplary embodiment, the plurality of RF output power levels spans a dynamic range of −50 dBm to +24 dBm, in 1 dB step sizes, so that the transmission requirements of a Class 3 transmitter in the 3GPP TS 25.101 standard are complied with.

Figure 5:
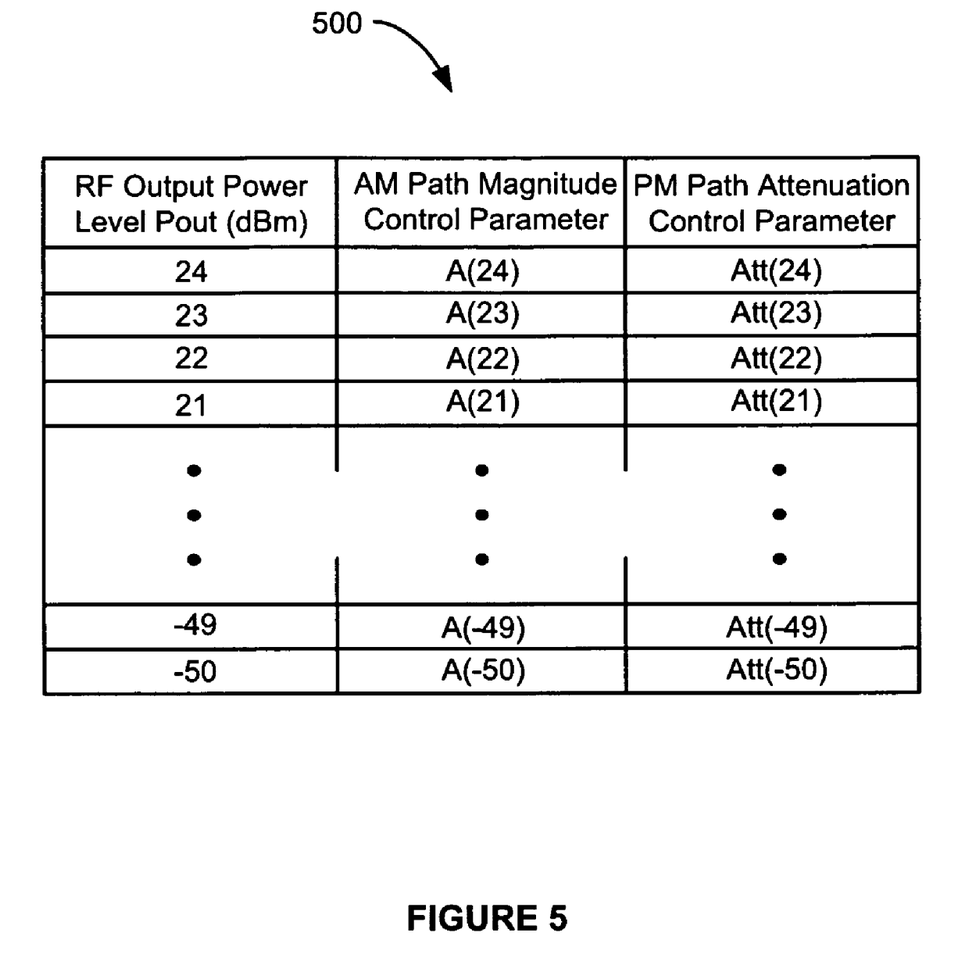
FIG. 5 is an exemplary look up table (LUT) that includes a plurality of output-power-level dependent AM path magnitude control parameters A(Pout) and PM path attenuation control parameter Att(Pout) for a plurality of RF output powers Pout the polar transmitter in FIG. 4 may be commanded to operate.

In response to each TPC command indicating a change in RF output power, the baseband processor 402 calculates what RF output power the power-tuned polar transmitter 400 should be configured to operate. Using the calculated RF output power level as an index, the baseband processor 402 then retrieves the appropriate AM path magnitude control and PM path attenuation control parameters A(Pout) and Att(Pout) from the LUT 500. For example, if the power-tuned polar transmitter 400 receives a +1 TPC command to increment RF output power by 1 dB while operating at an RF output power level of 22 dBm, the baseband processor 402 first calculates that the RF output power should be set to 23 dBm and then indexes the 23 dBm row of the LUT 500 to retrieve the A(23) AM path magnitude control parameter and the corresponding PM path attenuation control Att(23) parameter. Based on the values of the AM path magnitude control and PM path attenuation control parameters A(Pout) and Att(Pout) retrieved from the LUT 500, the baseband processor 402 then calculates the values of the magnitude control and attenuator control signals to apply to the amplitude modulator 406 and the attenuator 412. To improve accuracy or reduce the required LUT size, interpolation between LUT entries can be employed.

It should be pointed out here that whereas a LUT with output-power-level dependent AM path magnitude control and PM path amplitude control parameters A(Pout) and Att(Pout) is used to calculate the values of the magnitude control and attenuator control signals, other techniques such as, for example, polynomial encoding may be employed to determine and set the appropriate values of the magnitude control and attenuator control signals, as will be appreciated by those of ordinary skill in the art.

As the power-tuned polar transmitter 400 transmits, the baseband processor 402 adjusts the magnitude control and attenuator control signals in response to each TPC command and in the manner described above, so that the RF input power Pin of the amplitude-adjusted constant-envelope phase-modulated RF carrier signal applied to the RF input port of the PA 414 and the magnitude of the amplitude-modulated power supply signal Vcc applied to the power supply port of the PA 414 are of the values necessary to effect each commanded power step. Further, the AM path magnitude control and PM path attenuation control parameters A(Pout) and Att(Pout) of the LUT 500 have values that allow the baseband processor 402 to control the RF output power following each commanded power step in a continuous manner over the full dynamic range in RF output power the power-tuned polar transmitter 400 may be commanded to operate, thereby ensuring compliance with power control ranges (i.e. tolerances) set by standard, for example as set by the 3GPP TS 25.101 standard. As mentioned above, if necessary, or to reduce the size of the LUT, interpolation between LUT entries may be employed.

Figure 6:
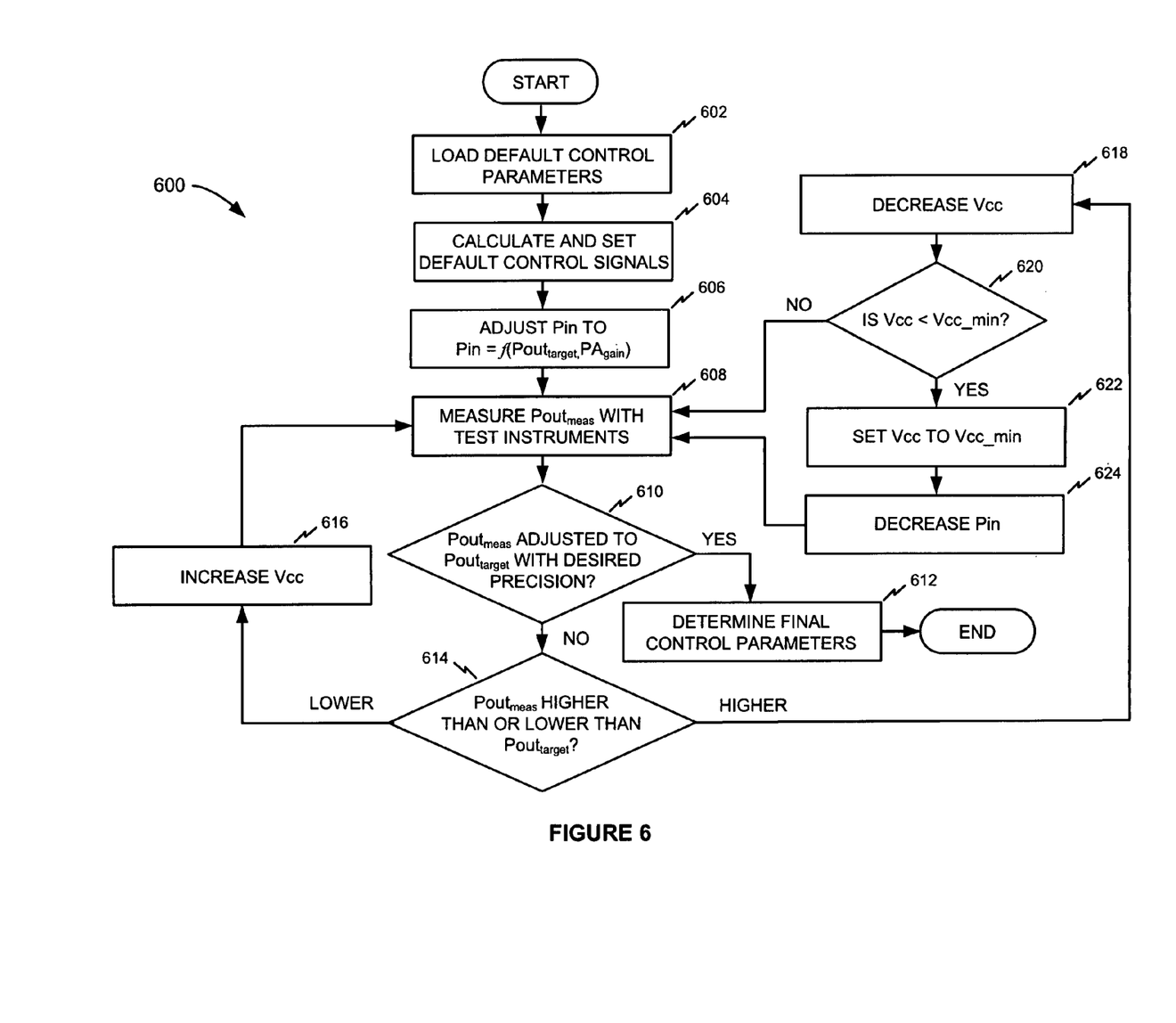
FIG. 6 is a flowchart of a power tuning method that is applied to a polar transmitter during manufacturing or a calibration phase to determine the plurality of output-power-level dependent AM path magnitude control parameters A(Pout) and PM path attenuation control parameters Att(Pout) for use by the polar transmitter during normal operation, according to an embodiment of the present invention.

FIG. 6 is a flowchart of the power tuning method 600 that is applied to the polar transmitter 400 prior to normal operation (e.g., during manufacturing or a calibration phase), to determine the AM path magnitude control and PM path attenuation control parameters A(Pout) and Att(Pout) of the LUT. In one embodiment, the power tuning method 600 is executed by a controller 702, such as a personal computer (PC), as shown in the power tuning setup 700 in FIG. 7. The controller 702 is configured to generate test data patterns for the polar transmitter being tuned 705 and to either control the modulating and control functions of the baseband processor 402 or emulate the modulating and control functions performed by the baseband processor 402 during normal operation.

Figure 7:
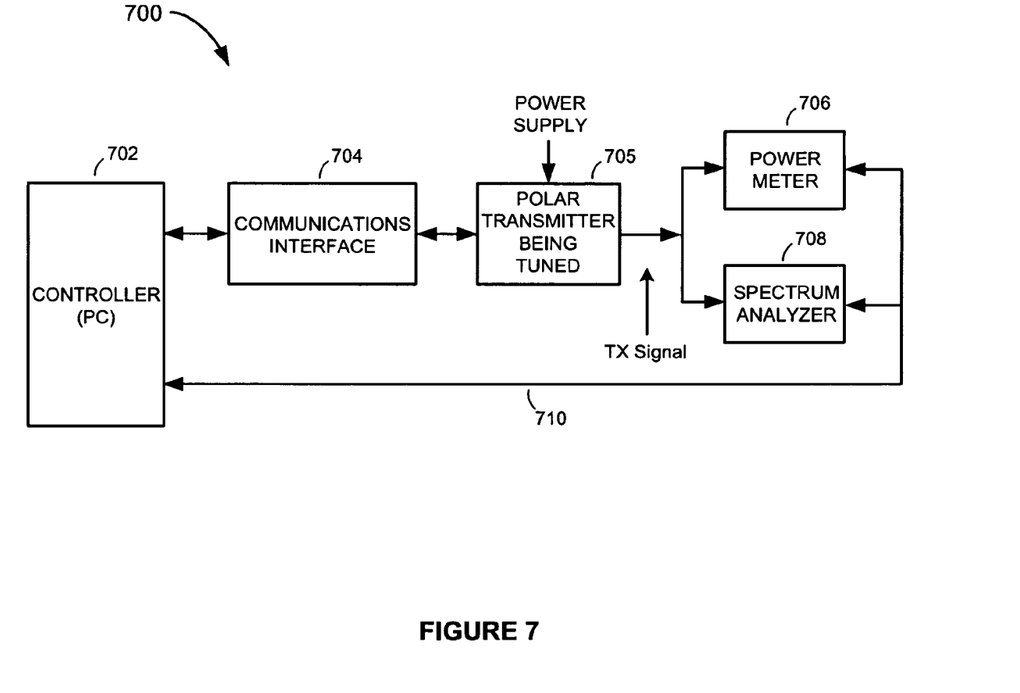
FIG. 7 is a power tuning setup that may be used to perform the power tuning method in FIG. 6.

In a first step 602 of the power tuning method 600, default AM path magnitude control and PM path attenuation control parameters A(default) and Att(default) are loaded into RAM of the controller 702. The default control parameters are determined beforehand, e.g., experimentally in the laboratory, and are used by the controller 702 to initialize the functioning of the polar transmitter being tuned 705.

In step 604, the controller 702 uses the default AM path magnitude control and PM path attenuation control parameters A(default) and Att(default) to calculate default magnitude control and attenuator control signals to apply to the control inputs of the amplitude modulator 406 and the attenuator 412 of the polar transmitter being tuned 705. Once calculated, the controller 702 applies the default control signals to the control inputs of the amplitude modulator 406 and the attenuator 412 via a communications interface 704.

Next, in step 606, while sending test data to the polar transmitter being tuned 705 via the communications interface 704, the controller 702 adjusts the attenuator control signal to the attenuator 412 in the PM path of the polar transmitter being tuned 705 (also via the communications interface 704), so that the RF input power Pin to the PA 414 is a function of the target output power $Pout_{target}$ (e.g., $Pin=(Pout_{target}-PA_{gain}))$, where $Pout_{target}$ is the target RF output power to which the polar transmitter being tuned 705 is being tuned and $PA_{gain}$ is the gain of the PA 414.

In step 608, test instruments, such as a power meter 706 and/or a spectrum analyzer 708, are used to measure the actual RF output power $Pout_{meas}$ of the polar transmitter being tuned 705. To automate the measurement process, the test instruments 706 and/or 708 may be controlled by the controller 702 over a control bus 710, such as a general purpose interface bus (GPIB), for example, as illustrated in FIG. 7.

In step 610 the controller 702 compares the measured RF output power $Pout_{meas}$ to the target RF output power $Pout_{target}$, to determine whether the measured RF output power $Pout_{meas}$ is within the desired precision of the target RF output power $Pout_{target}$. If yes, in step 612 the controller 702 calculates and records the final AM path magnitude control and PM path attenuation control parameters A(final) and Att (final) based on the current RF input power Pin and amplitude-modulated power supply signal Vcc settings.

If in step 610 the controller 702 determines that the measured RF output power $Pout_{meas}$ is not within a desired precision of the target RF output power $Pout_{target}$, in step 614 the controller 702 determines whether the measured RF output power $Pout_{meas}$ is higher than or lower than the target RF output power $Pout_{target}$. If it is lower, in step 616 the controller 702 adjusts the magnitude control signal to the amplitude modulator 406, via the communications interface 704, to increase the magnitude of the amplitude-modulated power supply signal Vcc. Once the magnitude of the amplitude-modulated power supply signal Vcc has been increased, steps 608 and 610 are performed again to determine whether the new measured RF output power $Pout_{meas}$ is within the desired precision of the target RF output power $Pout_{target}$, and, if not, whether the magnitude of the amplitude-modulated power supply signal Vcc needs to be further increased in step 616. Once the amplitude-modulated power supply signal Vcc has been increased to a level that results in the measured RF output power $Pout_{meas}$ being within the desired precision of the target RF output power $Pout_{target}$, the controller 702 calculates and records the final AM path magnitude control and PM path attenuation control parameters A(final) and Att(final) in step 612 based on the current RF input power Pin and amplitude-modulated power supply signal Vcc settings.

If in step 610 the controller 702 determines that the measured RF output power $Pout_{meas}$ is not within the desired precision of the target RF output power $Pout_{target}$, and in step 612 determines that the measured RF output power $Pout_{meas}$ is higher than the target RF output power $Pout_{target}$, in step 618 the controller 702 adjusts the magnitude control signal to the amplitude modulator 406 of the polar transmitter being tuned 705, via the communications interface 704, to decrease the magnitude of the amplitude-modulated power supply signal Vcc.

Once the magnitude of Vcc has been decreased, in step 620 the controller 702 queries as to whether the resulting Vcc setting is less than a minimum allowable Vcc setting Vcc_min. If no, step 608 and the applicable steps following it are repeated as necessary, until the measured RF output power $Pout_{meas}$ is within the desired precision of the target RF output power $Pout_{target}$ and the controller 702 has calculated the final AM path magnitude control and PM path attenuation control parameters A(final) and Att(final) in step 612.

If in step 620 the controller 702 determines that the magnitude of the amplitude-modulated power supply signal Vcc following the adjustment in step 618 is less than the minimum allowable Vcc setting Vcc_min, in step 622 the controller 702 adjusts the magnitude control signal to the amplitude modulator 406, so that the magnitude of the amplitude-modulated power supply signal Vcc is equal to the minimum allowable Vcc setting Vcc_min.

Then, in step 624, rather than reducing the magnitude of the amplitude-modulated power supply signal Vcc any further, the controller 702 adjusts the attenuator control signal to the attenuator 412 of the polar transmitter being tuned 705, via the communications interface 704, so that the RF input power Pin to the PA is decreased. The purpose of limiting the extent to which the magnitude of the amplitude-modulated power supply signal Vcc can be decreased is to reduce the effects of leakage (i.e., feed-through) of the phase-modulated RF carrier signal from the RF input of the PA to the RF output of the PA. (As was explained above, a low magnitude amplitude-modulated power supply signal Vcc results in a degraded signal-to-noise ratio (SNR) at the RF output of the PA, which makes it difficult to comply with noise level restrictions, such as those specified in Section 6 of the 3GPP TS 25.101 specification.)

After Pin has been decreased in step 624, step 608 and the applicable steps following it are repeated as necessary until the measured RF output power $Pout_{meas}$ is within the desired precision of the target RF output power $Pout_{target}$ and the controller 702 has calculated the final AM path magnitude control and PM path attenuation control parameters A(final) and Att(final) in step 612.

The power tuning method 600 described above is repeated for additional target RF output powers Pout$_{target}$ to determine final AM path magnitude control and PM path attenuation control parameters A(final) and Att(final) for each of the additional target RF output powers Pout$_{target}$. The control parameters for all target RF output powers Pout$_{target}$ are then populated in the LUT 500 (see FIG. 5) and stored in the nonvolatile memory 418, so that the LUT 500 is accessible by the baseband processor 402 during normal operation.

In the power tuning method 600 described above, AM path magnitude control and PM path attenuation control parameters A(final) and Att(final) are determined for each target RF output power Pout$_{target}$ and arranged in a LUT for during normal operation. In an alternative embodiment, the power tuning method 600 is modified so that polynomial coefficients are calculated for each target RF output power Pout$_{target}$. During normal operation, a polynomial equation describing the transfer characteristics of the polar transmitter's PA is modified according to the output-power-level dependent polynomial coefficients to set the magnitude control signal to the amplitude modulator 406 and the attenuator control signal to the attenuator 412 to their appropriate values.

Figure 8:
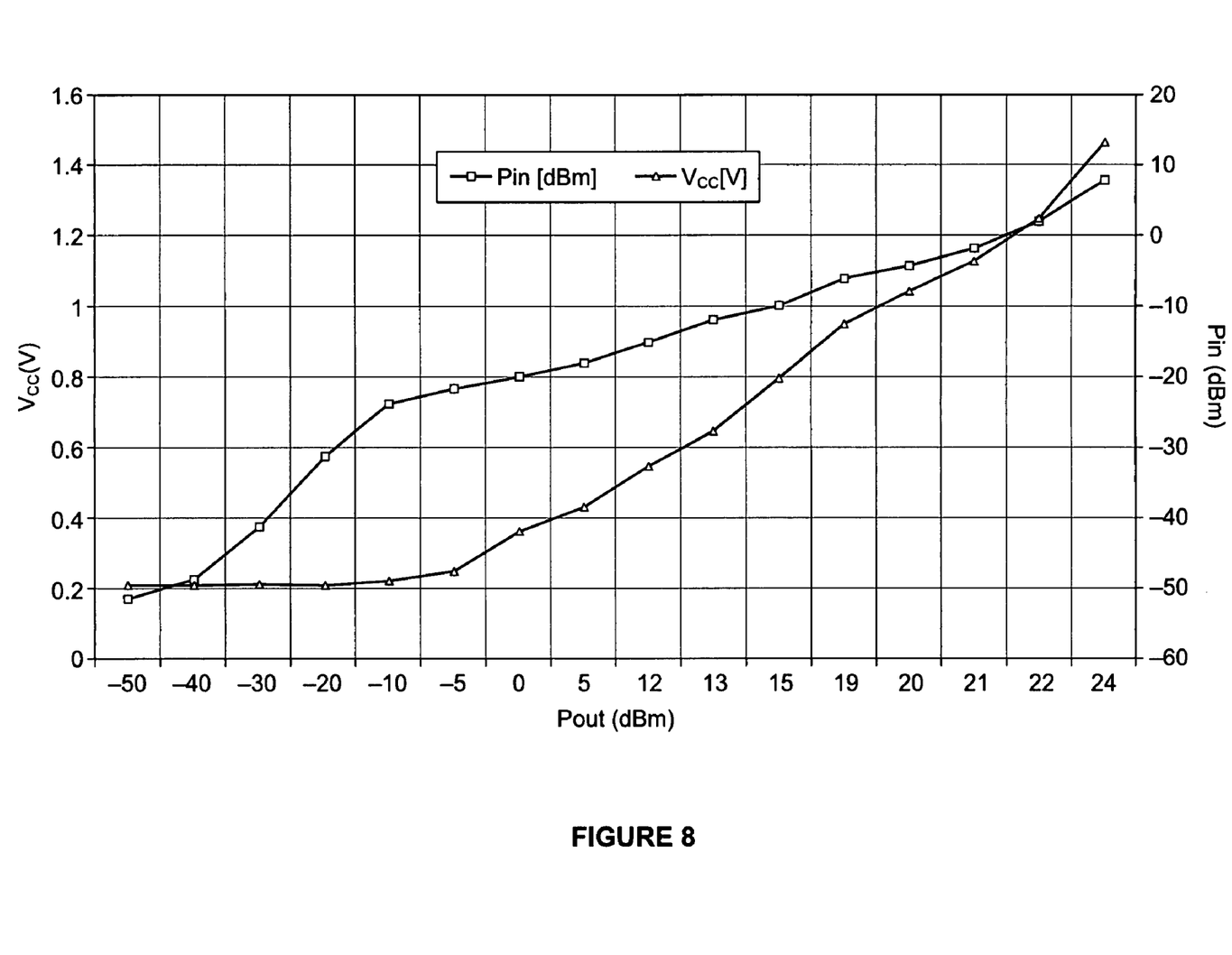
FIG. 8 is a graph of RF output power (Pin) settings and amplitude-modulated power supply signal settings (Vcc) obtained by application of the power tuning method in FIG. 6 for a plurality of RF output powers Pout spanning a dynamic range of about −50 dBm to +24 dBm.

The effectiveness of the power tuning method 600 at tuning the polar transmitter has been verified for various types of PAs. FIG. 8 shows, for example, the RF input power Pin settings and amplitude-modulated power supply signal Vcc settings (i.e., the RF output power control "tuning settings") obtained by application of the power tuning method 600 to a polar transmitter having a heterojunction bipolar transistor (HBT) type of PA. As can be seen, the tuning settings increase continuously over an RF output power range of about −50 dBm to +24 dBm. Also, at RF output powers below about −5 dBm, it is seen that the magnitude of the amplitude-modulated power supply signal Vcc is maintained at a level above approximately Vcc_min=0.2 volts. As explained above, the magnitude of the amplitude-modulated power supply signal Vcc is maintained above Vcc_min for low RF output powers to ensure that the SNR at the RF output of the polar transmitter is not degraded.

Figure 9:
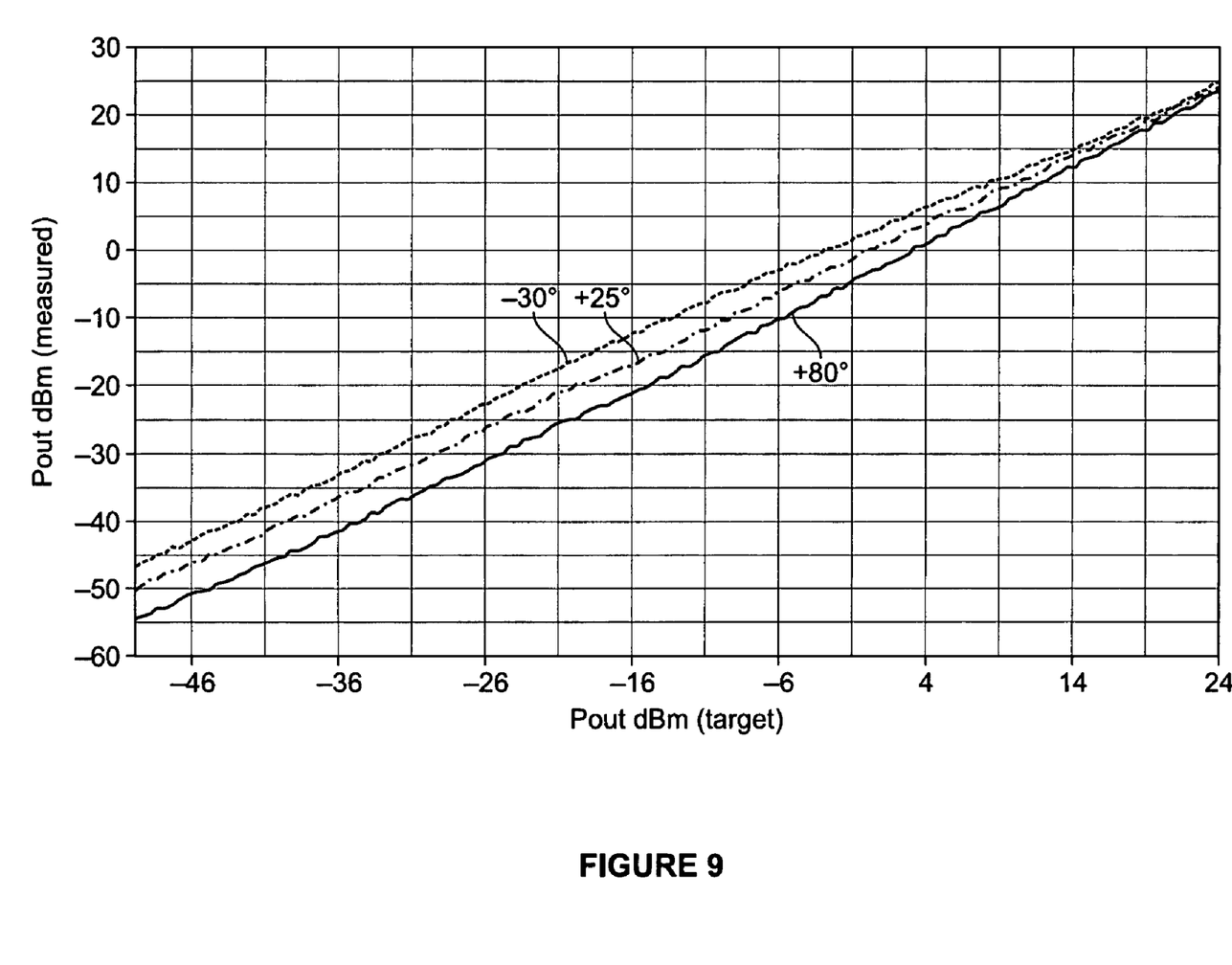
FIG. 9 is a graph of the actual (i.e., "measured") RF output powers of a polar transmitter tuned according to the power tuning method in FIG. 6 versus a plurality of target RF output powers Pout (target) spanning a range of about −50 dBm to +24 dBm and for three different temperatures.

It has also been verified that controlling the RF output power of the polar transmitter using the AM path magnitude control and PM path attenuation control parameters A(Pout) and Att(Pout) obtained from the power tuning method 600 results in power linearity over a wide dynamic range. This power linearity characteristic can be observed in FIG. 9, which plots measured RF output power Pout$_{meas}$ (Pout dBm (measured)) versus target RF output power Pout$_{target}$ (Pout dBm (target)) for an actual PA over an RF output power range of about −50 dBm to +24 dBm for three different operating temperatures of −30° C., +25° C. and +80° C. As can be seen, the power curve for each temperature is linear and continuous, having no abrupt changes in RF output power (i.e., there are no power discontinuities) over the full −50 dBm to +24 dBm RF output power range. This power linearity characteristic ensures that the PA, when configured in the polar transmitter 400 above, operates in accordance with the power control ranges (see FIG. 2) specified in the 3GPP TS 25.101 standard.

Although the present invention has been described with reference to specific embodiments, those embodiments are merely illustrative and not restrictive of the present invention. Further, various modifications or changes to the specifically disclosed exemplary embodiments will be suggested to persons skilled in the art and are to be included within the spirit and purview of this application and scope of the appended claims.

What is claimed is:

1. A power tuning method that is applied to a power amplifier (PA) prior to normal operation, comprising:
   a) applying a magnitude control signal to a magnitude control input of an amplitude modulator configured to control a magnitude of an amplitude-modulated power supply signal applied to a power supply port of the PA;
   b) applying an amplitude control signal to an amplitude control input of an amplitude control circuit configured to control an input power of a constant-envelope phase-modulated carrier signal applied to a signal input of the PA;
   c) setting the input power of the constant-envelope phase-modulated carrier signal to a predefined value determined by a function characterizing input-output power characteristics of the PA;
   d) measuring an actual output power of an output signal at a signal output of the PA;
   e) determining whether the actual output power is within a desired precision of a target output power;
   f) modifying the magnitude control signal, if it is determined that the actual output power is not within the desired precision of the target output power, by one of increasing the magnitude control signal if the actual output power is lower than the target output power and reducing the magnitude control signal if the actual output power is higher than the target output power;
   g) determining whether the magnitude control signal has been reduced to a minimum allowable value and if the value of the magnitude control signal has been reduced to the minimum allowable value, reducing the input power of the constant-envelope phase-modulated carrier signal, instead of reducing the magnitude control signal below the minimum allowable value;
   h) repeating steps d) through g) until the actual output power is within the desired precision of the target output power; and
   j) calculating polynomial coefficients from the values of the magnitude control signal and input power after it is determined that the actual output power is within the desired precision of the target output power.

2. The power tuning method of claim 1, further comprising calculating first and second power control parameters from the values of the magnitude control signal and input power after it is determined that the actual output power is within the desired precision of the target output power.

3. The power tuning method of claim 2, further comprising repeating steps c) through h) for a plurality of different target output powers, said plurality of different target output powers determined based on the input-output power characteristics of the PA.

4. The power tuning method of claim 3, further comprising arranging first and second power control parameters calculated for each target output power of said plurality of different target output powers in a look up table (LUT).

5. The power tuning method of claim 4, further comprising storing said LUT in a nonvolatile memory.

6. The power tuning method of claim 4 wherein said LUT comprises a plurality of entries, each entry corresponding to one of the target output powers of said plurality of different target output powers, and each entry including associated first and second power control parameters.

* * * * *